United States Patent
Mork et al.

(10) Patent No.: US 12,163,780 B2
(45) Date of Patent: Dec. 10, 2024

(54) SENSING SYSTEM HAVING A CONCENTRATOR FOR SENSING FORCE APPLIED TO A MECHANICAL COMPONENT

(71) Applicant: Deere & Company, Moline, IL (US)

(72) Inventors: Alexander M. Mork, West Fargo, ND (US); Michael L. Rhodes, Richfield, MN (US); Ryan A. Stieg, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 227 days.

(21) Appl. No.: 17/805,308

(22) Filed: Jun. 3, 2022

(65) Prior Publication Data

US 2023/0392918 A1 Dec. 7, 2023

(51) Int. Cl.
- G01B 7/16 (2006.01)
- G01G 3/14 (2006.01)
- G01L 1/04 (2006.01)
- G01L 1/22 (2006.01)

(52) U.S. Cl.
CPC ............... *G01B 7/16* (2013.01); *G01G 3/14* (2013.01); *G01L 1/044* (2013.01); *G01L 1/2206* (2013.01); *G01L 1/225* (2013.01)

(58) Field of Classification Search
CPC .. G01B 7/16; G01G 3/14; G01L 1/044; G01L 1/225; G01L 1/2206
See application file for complete search history.

(56) References Cited

U.S. PATENT DOCUMENTS

| | | | |
|---|---|---|---|
| 4,233,580 A | 11/1980 | Treczka et al. | |
| 7,808,346 B2 | 10/2010 | Fischer et al. | |
| 8,405,279 B2 | 3/2013 | Elmegreen et al. | |
| 10,782,818 B2 | 9/2020 | Deng et al. | |

(Continued)

FOREIGN PATENT DOCUMENTS

| | | | |
|---|---|---|---|
| DE | 102019202763 A1 * | 8/2020 | ........... G01G 19/021 |
| EP | 1162429 A1 * | 12/2001 | ............... G01B 7/18 |
| EP | 1162429 B1 | 11/2014 | |

OTHER PUBLICATIONS

Extended European Search Report and Written Opinion issued in European Patent Application No. 23172078.0, dated Oct. 11, 2023, in 10 pages.

(Continued)

*Primary Examiner* — Peter J Macchiarolo
*Assistant Examiner* — John M Royston (57) ABSTRACT

A sensing system comprises a mechanical component that is subject to an applied force. The mechanical component has an outer surface with bores. A concentrator is connected to the mechanical component via fasteners that pass through openings that align with the bores. The concentrator comprises a central neck portion with an elevated pedestal, a first extremity region extending outwardly away from the central neck portion and a second extremity region opposite the first extremity region. The second extremity region extends outwardly away from the central neck portion. A strain sensor is mounted on or coupled to the concentrator to transmit the applied force from the mechanical component via or through the concentrator to the mechanical component.

18 Claims, 6 Drawing Sheets

(56) References Cited

U.S. PATENT DOCUMENTS

| | | | |
|---|---|---|---|
| 2008/0204210 A1 | 8/2008 | Tanabe | |
| 2011/0081229 A1* | 4/2011 | Kottilingam | F01B 25/26 219/121.64 |
| 2021/0335524 A1* | 10/2021 | Kaneko | H01C 1/14 |
| 2022/0223486 A1* | 7/2022 | Fritz | H01L 23/13 |

OTHER PUBLICATIONS

TelMA Torque—the revolutionary torque measurement for Industry 4.0 and machine monitoring, pp. 1-7 [online]. Retrieved from the Internet <URL:https://www.sensortelemetrie.de/en/products/torque-measurement-technology/telma-torque-miniaturised-torsion-sensor/>.

Abdolkhani et al., A Double Stator Through-hole Type Contactless Slipring for Rotary Wireless Power Transfer Applications, IEEE Transactions on Energy Conversion, vol. 29, No. 2, Jun. 2014, pp. 426-434.

Stefan Ditze et al., Inductive Power Transfer System with a Rotary Transformer for Contactless Energy Transfer on Rotating Applications, dated 2016, pp. 1622-1625.

Lajnef et al., Self-Powered Piezo-Floating-Gate Smart-Gauges Based on Quasi-Static Mechanical Energy Concentrators and Triggers, IEEE Sensors Journal, vol. 15, No. 2, Feb. 2015, pp. 676-683.

Contactless Rotary Electrical Couplings, Mar. 1, 2003, pp. 1-7, [online]. Retrieved from the Internet <URL: https://www.techbriefs.com/component/content/article/tb/pub/techbriefs/electronics-and-computers/918>.

Contactless Data and Power Transmission for 360° Real-Time Applications, pp. 1-5, [online]. Retrieved from the Internet <URL: https://www.spinner-group.com/en/products/rotating-contactless-data-and-power-transmission>.

Jia-You Lee et al., Design of an Improved Type Rotary Inductive Coupling Structure for Rotatable Contactless Power Transfer System, MATEC Web of Conferences, dated 2015, pp. 1-6, [online]. Retrieved from the Internet <URL: https://www.matec-conferences.org/articles/matecconf/pdf/2015/15/matecconf_icmme2015_06001.pdf>.

Mechanical stress concentrator with notches, axial stress sensing, pp. 1-5, [online]. Retrieved from the Internet <URL: https://mechanicalc.com/calculators/stress-concentration/>.

Mechanical stress concentrator with notches, torque stress sensing, pp. 1-5, [online]. Retrieved from the Internet <URL: https://mechanicalc.com/calculators/stress-concentration/>.

* cited by examiner

SENSING SYSTEM HAVING A CONCENTRATOR FOR SENSING FORCE APPLIED TO A MECHANICAL COMPONENT

FIELD

This disclosure relates to a sensing system having a concentrator for sensing force applied to a mechanical component.

BACKGROUND

In certain prior art, a sensing system may feature a concentrator provides an intermediate mounting structure for coupling or mounting a strain sensor to a mechanical component to sense or measure the force applied to the mechanical component, such as shaft, rotor or beam. In some prior art, the concentrator may be configured to mechanically transmit the force received at the strain sensor compared to a reference strain sensor that is directly connected the mechanical component. Moreover, some prior art concentrators may not be configurable to amplify, dampen or remain neutral to the applied or received force to be sensed. Accordingly, there is a need for a customizable or configurable concentrator for sensing force applied to a mechanical component.

SUMMARY

In accordance with one embodiment, a sensing system comprises a mechanical component that is subject to an applied force. The mechanical component has an outer surface with bores (e.g., threaded bores or openings). A concentrator is connected to the mechanical component via fasteners that pass through openings that align with the bores. The concentrator comprises a central neck portion with an elevated pedestal, a first extremity region extending outwardly away from the central neck portion and a second extremity region opposite the first extremity region. The second extremity region extends outwardly away from the central neck portion. A strain sensor is mounted on or coupled to the concentrator to transmit the applied force from the mechanical component via or through the concentrator to the mechanical component.

DETAILED DESCRIPTION

In accordance with certain embodiment, in FIG. 1A through FIG. 1D, inclusive, a sensing system comprises a mechanical component, such as a rotor 10 (e.g., shaft) that is subject to an applied force. The mechanical component has an outer surface 14 with bores (e.g., threaded bores or openings) and an inner surface 12. A concentrator 157 is connected to the mechanical component via fasteners that pass through openings that align with the bores. The concentrator 157 comprises a central neck portion, a first extremity region extending outwardly away from the central neck portion and a second extremity region opposite the first extremity region. The second extremity region extends outwardly away from the central neck portion. A strain sensor (101, 201) is mounted on or coupled to the concentrator 157 to transmit the applied force from the mechanical component via or through the concentrator 157 to the mechanical component. The concentrator 157 of FIG. 1A has an optional elevated pedestal. In contrast, FIG. 5A features an elevated pedestal of the neck portion.

In general, a strain sensor (e.g., 101 or 201) means any strain gauge, strain transducer, integrated circuit strain sensor, integrated circuit strain gauge, semiconductor strain sensor, semiconductor (e.g., silicon) strain gauge, piezoelectric sensor, piezoresistive sensor, micromechanical system (MEMS) sensor, a foil strain gauge, polycrystalline resistive sensor, capacitive strain sensor, or other transducer or sensor for estimating, measuring or sensing a magnitude of one or more strain vectors, or corresponding direction(s) of the strain vectors, or both, based on force(s) applied to the strain sensor, which is on or secured in, on or to an observed object to be measured. For example, foil strain gauge may comprise a metallic foil layer of conductive traces overlying one side of a dielectric substrate (e.g., flexible substrate), that supports elastic deformation of metallic foil layer; hence, a change in electrical property, such as resistance or capacitance. Further, in a foil strain gauge the opposite side of the dielectric substrate may adjoin a coupler to a rotor, shaft or other observed object, where the coupler may comprise an elastomeric layer (e.g., adhesively bondable elastomeric layer) or flexible adhesive layer. In some embodiments, certain strain sensors may comprise dual or triple strain gauges to measure orthogonal strain magnitudes (e.g., along Cartesian X and Y axes or along Cartesian X, Y and Z axes of a vehicle, implement, beam, shaft, rotor, or other observed object) that are approximately ninety degrees apart; other strain sensors may be configured to measure shear stress of a shaft exposed to torque; and still other strain sensors may be configured to measure shear stress in tension and compression of an observed object.

Figure 1A:
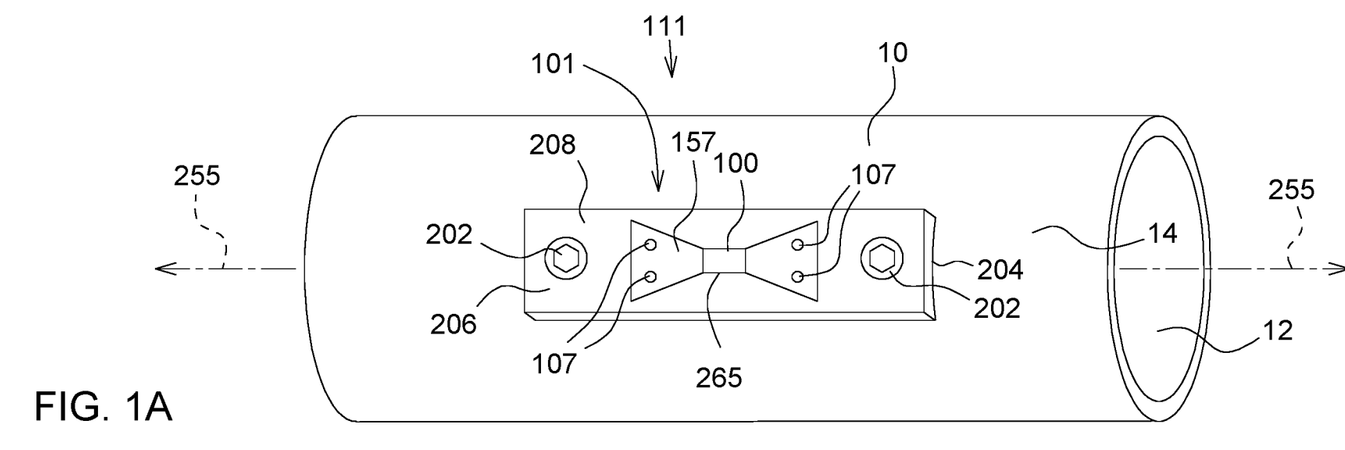
FIG. 1A is a perspective view of a first embodiment of a sensing system.
Figure 1B:
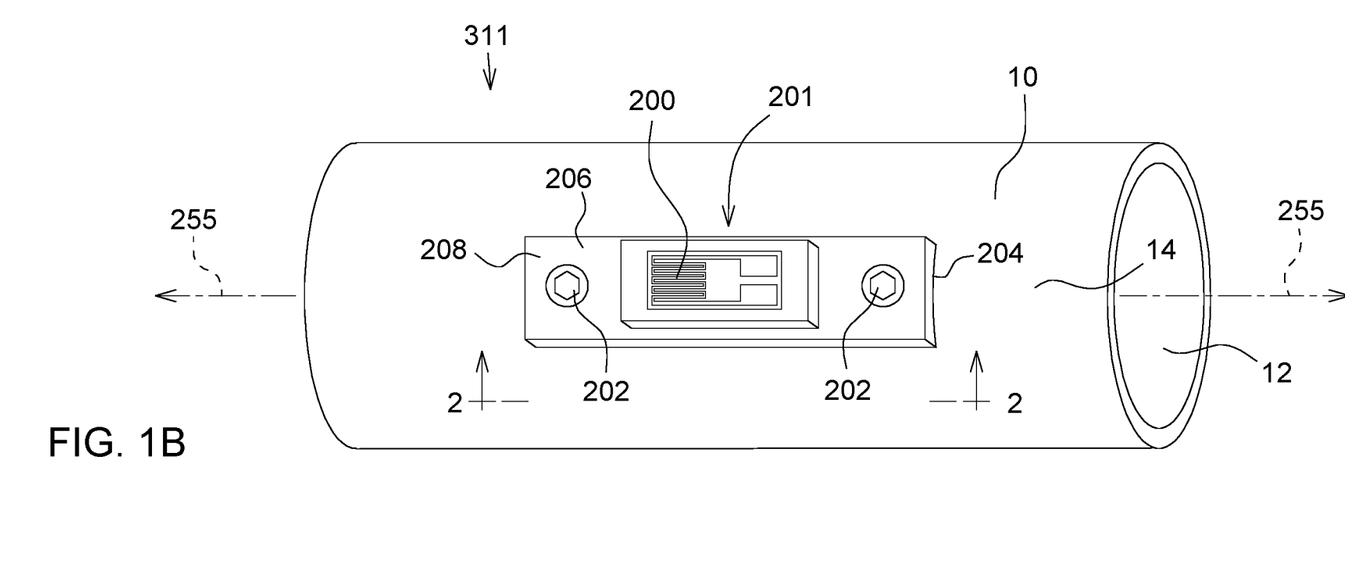
FIG. 1B is a perspective view of a second embodiment of a sensing system.

FIG. 1A is a perspective view of a first embodiment of a sensing system 111, where a concentrator 157 is mechanically secured to a rotor 10 or shaft via one or more of the following techniques: welding, brazing, soldering, adhesive bonding, rivets, or clips, or other fasteners 107. For example, the fasteners 107 may fasten through the outer face of the concentrator 157, blindly between the outer surface 14 of the rotor 10 and the inner face of the concentrator 157, or through holes in a hollow rotor 10 (e.g., hollow shaft) that align with corresponding apertures in the inner face of the concentrator 157. The concentrator 157 of FIG. 1A may be configured in accordance with the configuration and shape of the concentrator 157 illustrated in FIG. 5A through FIG. 5D, for example, except for the concentrator 157 the elevated pedestal is optional. Similarly, although the strain sensors (101, 201) of FIG. 1A and FIG. 1B is generically illustrated as a rectangular block, the strain sensor (101, 201) may be packaged in any conventional electronics package (100, 200) for a semiconductor device, sensor or chip, such as flip-chip packaging, a ball-grid array, through-hole packages, pin-grid arrays, surface-mount packages, or other packages.

The concentrator 157 is an intermediate component that is located between the mechanical component to be monitored for applied force, such as torque, strain, or stress. The mechanical component (e.g., rotor 10 or shaft) to be measured by strain sensor (101, 201), through the concentrator 157, can be virtually any kind of mechanical body, such as a rotor 10, shaft, joist, load-bearing member, bar, hitch assembly, implement component, frame, suspension member, beam or other structural support of a vehicle, an implement, a building or another structure.

In one embodiment, the strain sensor (101, 201) comprises a piezoresistive sensor or another strain transducer that is packaged in a standard electronics package (100, 200), such as integrated circuit package. The concentrator 157 (e.g., strain concentrator 157) is attached to the mechanical component (e.g., rotor 10 or target observed mechanical component) through welding, fusing, brazing solder, adhesive bonding and/or fasteners defined by specific application design. The concentrator 157 is attached or connected to the package (100, 200) of the piezo electric sensor (e.g., an integrated circuit package) through soldering or adhesion methods. The concentrator 157 directs displacement forces that are acting on the strain sensor (101, 201) as transmitted through the concentrator 157 and the package (100, 200) of the strain sensor (101, 201).

As shown in FIG. 1A, the strain concentrator 157 is associated with a mounting interface 208 that comprises a member with a concave surface 204 that is configured with a size and shape to interlock or engage the rotor 10 (e.g., shaft), where the mounting interface 208 is secured or retained to the rotor 10 via fasteners 202 that extend through bores in the mounting interface 208 and rotor 10. Further, the mounting interface 208 has a flat surface or substantially planar surface 206 with bores to support mounting of the concentrator 157 thereto.

In an alternate embodiment, the strain concentrator may be directly mounted to the rotor 10 (e.g., shaft via fasteners 46), such as flat 306 (in FIG. 2) or substantially planar region of the rotor 10, which could be machined, forged, cast, molded or created in accordance with other manufacturing techniques.

In certain embodiments, the strain concentrator 157 may or may not also have additional mounting features as part of its physical structure. These mounting features or mounting interface can be used to fasten circuit boards or other supporting elements used by the specific application. In general, the concentrator 157 enables a path for strain and displacement forces within the mechanical component to be measured directly, rather than inferred. The system of this disclosure supports manufacturing processes for the strain sensor (101, 201) by providing a target interface that can be mated after the electronics manufacturing step. The concentrator 157 is capable of being used for both positive going or negative going displacement/strain measurement and/or torque measurement of the observed mechanical component.

In certain embodiments, the strain concentrator 157 may comprise mounting features, such as holes or bores, for fastening the strain concentrator 157 to the mechanical component (e.g., target component) to be measured via bolts, screws, rivets, clips or other fasteners, for example. The fastener configuration may be selected facilitate or to optimize measurement performance.

In some embodiments, an optional circuit board may be used as an intermediate layer or intermediate component between the concentrator 157 and the strain sensor (101, 201). The concentrator 157 may optionally comprise one or more mounting features to fasten a circuit board or substrate, which may have a strain sensor (101, 201) mounted thereon or thereto.

The sensing system 311 of FIG. 1B is similar to the sensing system 111 of FIG. 1A, except the strain sensor 201 of FIG. 1B is different than the strain sensor 101 of FIG. 1A. Like reference numbers in any two drawings indicate like elements or like features.

FIG. 1B has a similar concentrator (e.g., 157) and strain sensor (101, 201) to FIG. 1A, except: (a) the concentrator has through holes for receiving fasteners to secure the concentrator to the rotor 10 via aligned apertures in the rotor 10 (e.g., shaft); (b) an illustrative example of a strain sensor 201 is shown in greater detail in FIG. 3 and FIG. 4; and (c) there is an optional intervening layer or intermediate layer between the concentrator and the piezoelectric member, where the intervening layer may comprise any of the following: (1) a stiffener (e.g., to attenuate and resist applied force to the concentrator for observation by the strain sensor (101, 201)), (2) a circuit board, such as flexible circuit board or rigid circuit board, (3) an elastomeric layer, or one or composed of an elastomer (e.g., to amplify or allow a reduced resistance range of movement responsive to certain applied force to the concentrator for observation by the strain sensor (101, 201)), and/or (4) one or more isolators, washers, stand-offs or resilient member, such as polymer, rubber or plastic members, alone or together with a circuit board, in, on, to which the strain sensor (101, 201) is mounted (e.g., to modulate the damping response, such as in a neutral zone between attenuation and amplification, of certain applied force to the concentrator for observation by the strain sensor (101, 201)).

As shown in FIG. 1B, the strain sensor 201 (and/or its concentrator) is associated with a mounting interface 208 that comprises a member with a concave surface 204 that is configured with a size and shape to interlock or engage the rotor 10 (e.g., shaft), where the mounting interface 208 is secured or retained to the rotor 10 via fasteners 202 that extend through bores in the mounting interface 208 and rotor 10. Further, the mounting interface 208 has a flat surface or substantially planar surface 206 with bores to support mounting of the strain sensor (and/or its concentrator) thereto.

Figures 1C, 1D:
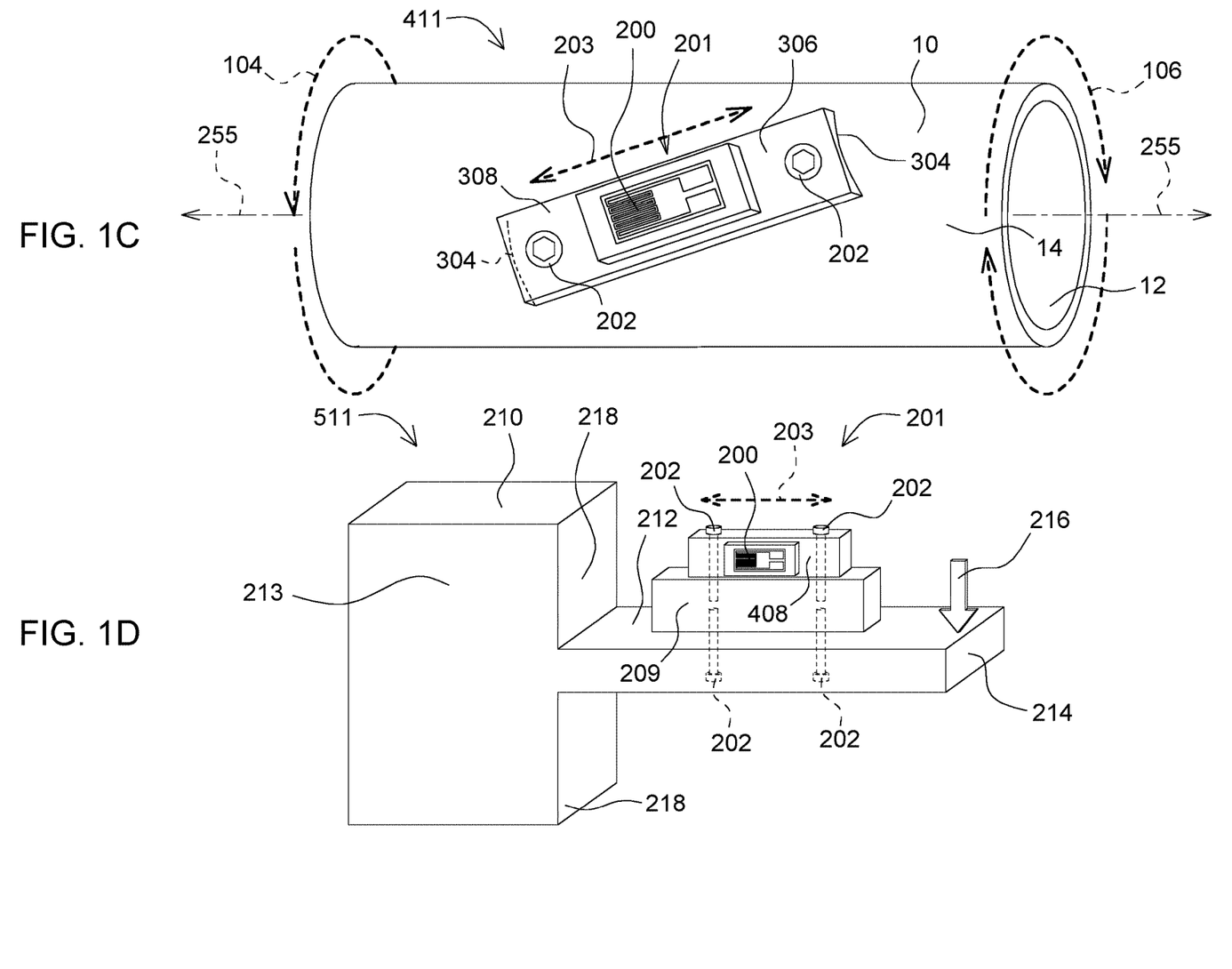
FIG. 1C is a perspective view of a third embodiment of a sensing system.
FIG. 1D is a perspective view of a fourth embodiment of a sensing system.

The sensing system 411 of FIG. 1C is similar to the sensing system 111 of FIG. 1A, except the strain sensor 201 of FIG. 1C is different than the strain sensor 101 of FIG. 1A and the strain sensor 201 is mounted at an angle relative to the central axis 255 of rotation of the rotor 10 (e.g., shaft). Like reference numbers in any two drawings indicate like elements or like features.

FIG. 1C is similar to the concentrator (e.g., 157) and strain sensor 201 of FIG. 1B, except the concentrator and its strain sensor 201 are mounted at a longitudinal angle along tilted axis 203 that is not coaxially aligned with the rotational axis 255 of the rotor 10 (e.g., shaft), where the longitudinal angle can be the (compound) angle formed at the intersection of the axes (203, 255). In one embodiment, the system of FIG. 1C may be configured to determine a torque difference between a first torque 104 at a first end of the rotor 10 or shaft and a second torque 106 at second end of the rotor 10 or the shaft.

Further in both FIG. 1B and FIG. 1C, there is an optional intervening layer or intermediate layer between the concentrator and the piezoelectric member, where the intervening layer may comprise any of the following: (1) a stiffener (e.g., to attenuate and resist applied force to the concentrator for observation by the strain sensor (101, 201)), (2) a circuit board, such as flexible circuit board or rigid circuit board, (3) an elastomeric layer, or one or composed of an elastomer (e.g., to amplify or allow a reduced resistance range of movement responsive to certain applied force to the concentrator for observation by the strain sensor (101, 201)), and/or (4) one or more isolators, washers, stand-offs or resilient member, such as polymer, rubber or plastic members, alone or together with a circuit board, in, on, to which the strain sensor (101, 201) is mounted (e.g., to modulate the damping response, such as in a neutral zone between attenuation and amplification, of certain applied force to the concentrator for observation by the strain sensor (101, 201)).

As shown in FIG. 1C, the strain sensor 201 (and/or its concentrator) is associated with a mounting interface 308 that comprises a member with a concave surface 304 that is configured with a size and shape to interlock or engage the rotor 10 (e.g., shaft), where the mounting interface 308 is secured or retained to the rotor 10 via fasteners 202 that extend through bores in the mounting interface 308 and rotor 10. Further, the mounting interface 308 has a flat surface or substantially planar surface 306 with bores to support mounting of the strain sensor (and/or its concentrator) thereto.

The sensing system 511 of FIG. 1D is similar to the sensing system 111 of FIG. 1A, except the strain sensor 201 of FIG. 1C is different than the strain sensor 101 of FIG. 1A. FIG. 1D is similar to the concentrator and strain sensor 201 of FIG. 1B, except the concentrator and strain sensor (101, 201) are mounted on a beam 212 that extends from a perpendicular support structure 213 to measure or sense a vertical load 216 on the beam 212. Further, the strain sensor 201 and the concentrator may be rotated spatially approximately ninety-degrees (90), plus or minus ten percent. Further, there is an intermediate modulator 209 (e.g., resilient member or elastomer) between the concentrator and the beam 212 to amplify, attenuate or dampen, or otherwise adjust the measurement of the vertically applied force to the beam 212. Like reference numbers in any two drawings or figures indicate like elements or features.

The mounting interface 408 two sets of bores located transversely to the mounting interface 208; where the fasteners 202 engage the lower bores to attach the mounting interface 408 to beam 212 and where the fasteners 202 engage the upper bores to attach the mounting interface 408 to beam 212. As illustrated the beam 212 has a first cross section 214, whereas the support structure has a second cross section 210 and vertical wall 218 from which the beam 212 extends, for example.

Further in both FIG. 1B and FIG. 1D, there is an optional intervening layer or intermediate layer between the concentrator and the piezoelectric member 201, where the intervening layer may comprise any of the following: (1) a stiffener (e.g., to attenuate certain applied force to the concentrator for observation by the strain sensor (101, 201)), (2) a circuit board, such as flexible circuit board or rigid circuit board, (3) an elastomeric layer, or one or composed of an elastomer (e.g., to amplify or allow a reduced resistance range of movement responsive to certain applied force to the concentrator for observation by the strain sensor (101, 201)), and/or (4) one or more isolators, washers, stand-offs or resilient member, such as polymer, rubber or plastic members, alone or together with a circuit board, in, on or to which the strain sensor (101, 201) is mounted.

Figure 2:
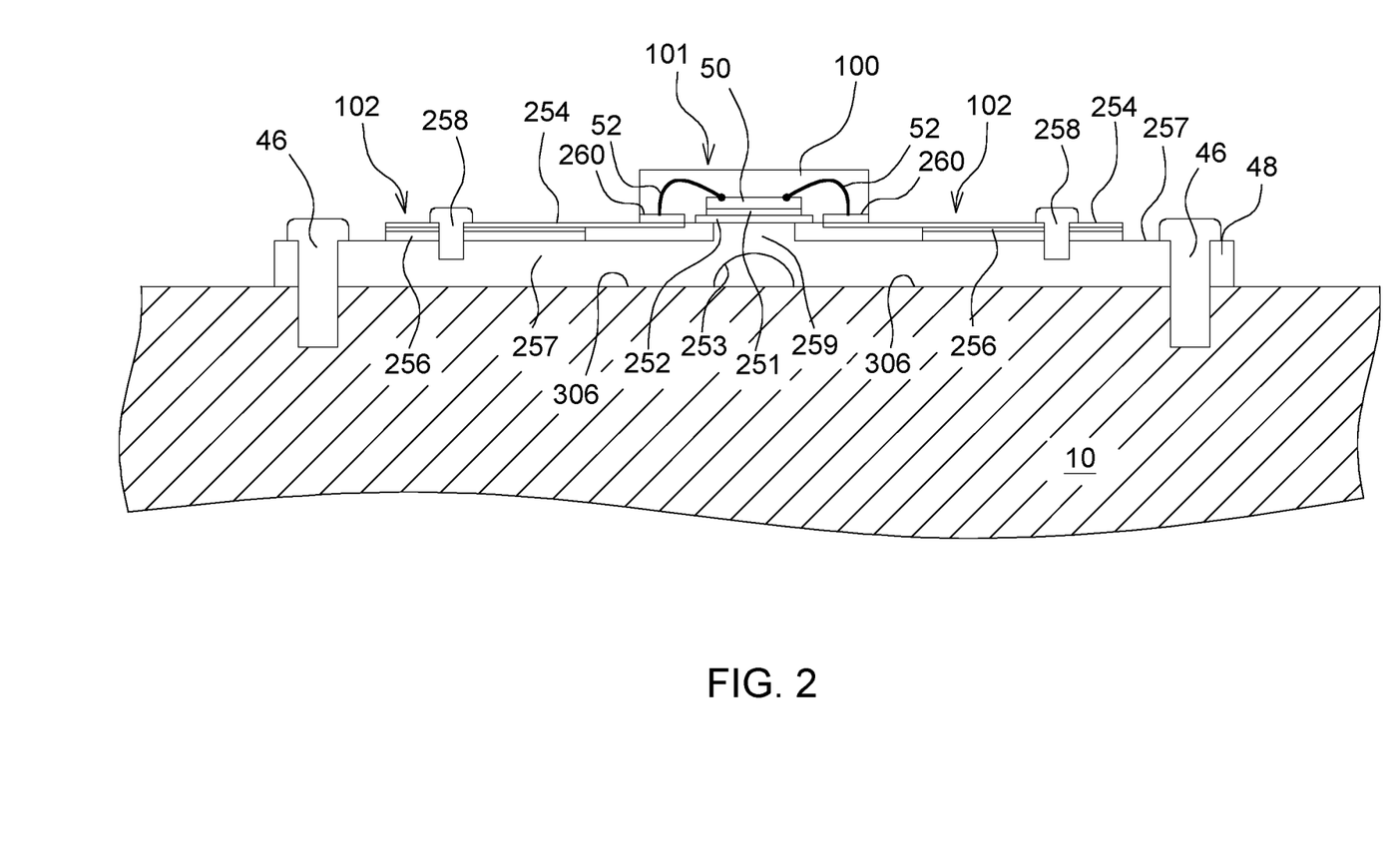
FIG. 2 shows a cross-section of an illustrative embodiment of a strain sensor of FIG. 1A in greater detail.

FIG. 2 shows one embodiment of the strain sensor (101, 201) 101 in greater detail. FIG. 2 shows an enlarged version as viewed along reference line 2-2 in FIG. 1A, where the enlarged rectangular region shows the strain sensor (101, 201) 101 in greater detail. FIG. 2 is a cross-section of a strain sensor (101, 201) 101 such as a piezoresistive sensor, strain gauge, strain sensing element, or the like that is disposed on the rotor 10 or shaft to measure any of the following sensor measurements: torque, torsional forces or torsional moments of the rotor 10 or shaft. The assembly 211 for contactless transferring electrical energy to a rotor 10 can provide electrical energy to the strain sensor (101, 201) 101, alone or together with an amplifier, to support changes in measured resistance, voltage, current or other electrical parameters indicative of sensor measurements. During operation of the assembly 211, the rotor 10 is generally rotated with respect to the stator 21 to generate or facilitate inductive transfer or wireless transfer of electrical energy from the transmitter 20 antenna of the transmitter 20 to the receiver 19 antennas portions of the receiver 19 of the rotor 10. Although wireless transfer of electric energy can occur when the rotor 10 is stationary, the receiver 19 is coupled to the receive antenna (603, 703, 803) and configured to facilitate the uniform transfer of electrical energy via the axial gap 24 between the transmitter 20 and the receive antenna over a full angular range of rotation of the rotor 10, such that the radiation pattern of the receive antenna (603, 703, 803) can intercept and capture the signal that is distributed over the full angular range.

In one configuration, FIG. 2 comprises a rotor 10 or shaft in which a strain concentrator 257 is mechanically coupled or connected to the rotor 10 or the shaft, such as at a flat 306 or a planar portion of the rotor 10 with bores (e.g., threaded bores). As illustrated in FIG. 2, the strain sensor (101, 201) 101 may be mounted to a shaft or rotor 10 via bores or threaded bores (in the rotor 10) that accept fasteners 46. For example, the strain sensor (101, 201) 101 is mechanically coupled to the rotor 10 and is configured to receive electrical energy from the receiver 19 via wires (e.g., DC voltage carrying wires); wherein the rotor 10 is configured to measure torque or strain associated with the rotor 10. Further in certain configurations, the die 50 of the strain sensor (101, 201) 101 is mounted or adhesively bonded (e.g., via adhesive 251, such as epoxy) to the rotor 10 via a central pedestal portion 259 or elevated neck of a strain concentrator 257. Below the central pedestal portion 259 is a neck and an arched portion 253.

The shape, material (composition), and other parameters of strain concentrator 257 may be configured to present or introduce gain, dampening, or neutrality into the output signal path of the respective strain sensor (101, 201) 101 coupled to the strain concentrator 257. For example, the strain concentrator 257 may a first wide outer region and a second wide outer region that are interconnected by a central narrow neck region below the central pedestal portion 259, where the strain is concentrated (amplified) and where the strain sensor (101, 201) 101 can be mounted on the central narrow neck region or on a pedestal portion 259 extending above the central narrow neck region.

In accordance with mounting system 102, an optional stiffener 256 is positioned between a circuit board 254 (e.g., flexible circuit board or carrier) and a portion of the strain concentrator 257, such as portion that is located inward from the bores 48 and corresponding fasteners 46 that secure or attach the strain concentrator 257 to the respective rotor 10 or respective shaft. The fasteners 258 secure the circuit board 254 and stiffener 256 to the strain concentrator 257 via one or more bores therein.

The die 50 of the strain sensor (101, 201) 101 is mounted on a central portion or raised pedestal portion 259 of the strain concentrator 257. The circuit board 254 may have metallic pads or electrically conductive pads 260, where wire bonds 52 connect the electrically conductive pads 260 to a die 50 or semiconductor portion of the strain sensor (101, 201) 101. Further, the die 50 may be associated with a conductive ground plane or large (grounded) metallic pad 252 that is electrically connected and mechanically connected (e.g., soldered, brazed, attached by conductive adhesive) to the central portion or raised pedestal portion 259 of the strain concentrator 257. As illustrated in FIG. 2, the die 50, the conductive pads 260 and the wire-bonds 52 are encapsulated by an electronics package (100, 200) with a dielectric body.

Figure 3:
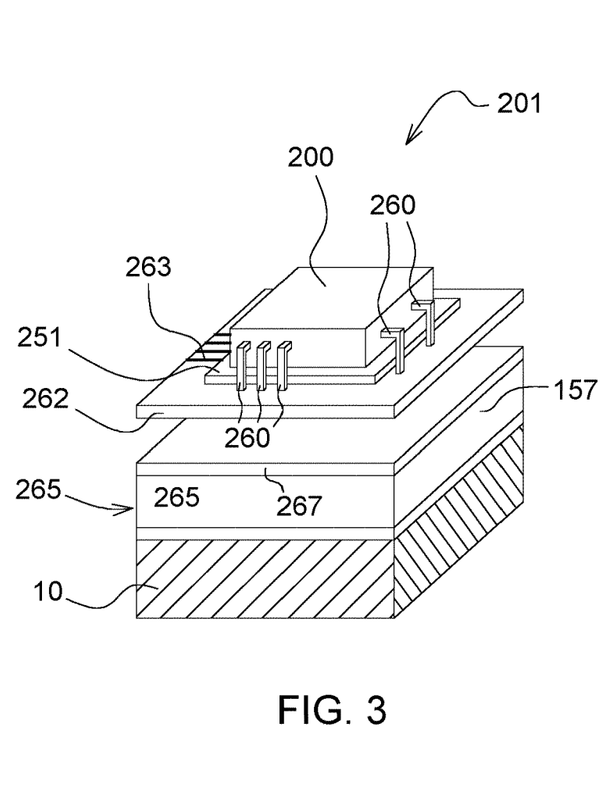
FIG. 3 shows an exploded perspective view of an illustrative embodiment of a strain sensor of FIG. 1B through FIG. 1D, inclusive.

FIG. 3 shows an exploded perspective view of an illustrative embodiment of a strain sensor 201 of FIG. 1B through FIG. 1D, inclusive, where the concentrator 157 is cutaway to retain a central rectangular region of the concentrator 157. The strain sensor 201 may comprise any piezoelectric devices, piezoresistive devices, strain gauge, or polycrystalline resistors, or the like. Although the strain sensor 201 in FIG. 3 and FIG. 4 has pin terminals 260, in alternate embodiments any suitable electronics package 200 can be used and falls within the scope of the appended claims. As shown, the strain sensor 201 is adhesively bonded or adhered to the circuit board 272, such as rigid circuit board or a flexible circuit board. The circuit board 262 comprises a dielectric substrate and conductive metallic traces 263 that overlie the dielectric substrate. FIG. 3 is shown as an exploded diagram where there is an artificial separation between a lower surface of the circuit board 262 and an upper surface of the intervening layer 267 (e.g., stiffener). The neck region 265 of the concentrator 157 is below the intervening layer 267; as illustrated, the elevated pedestal portion is not shown in FIG. 3 and FIG. 4. The neck region 265 directly interfaces with a flat portion or substantially planar portion of the rotor 10 or shaft.

Figure 4:
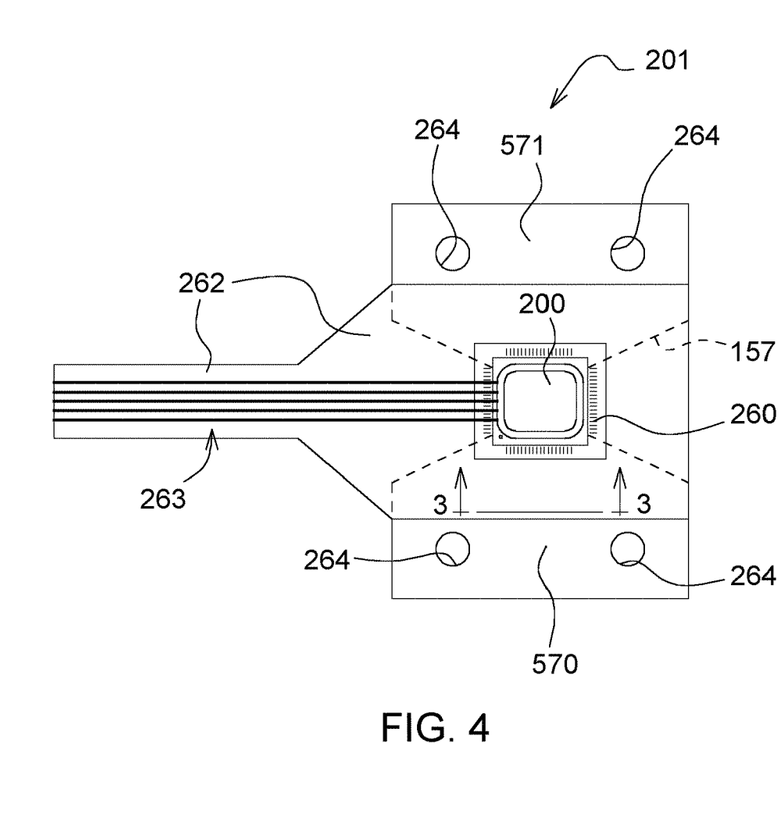
FIG. 4 shows a plan or top view of an illustrative of embodiment of a strain sensor of FIG. 1B through FIG. 1D, inclusive.

FIG. 4 shows a plan or top view of an illustrative of embodiment of a strain sensor (101, 201) of FIG. 1B through FIG. 1D, inclusive. In FIG. 4, FIG. 3 is shown from the perspective of reference line 3-3. Like reference numbers in FIG. 3, FIG. 4 and other drawings indicate like features or elements. FIG. 4 shows the conductive traces 263 in greater detail than FIG. 3. The concentrator 157 is shown in phantom, as dashed lines, in FIG. 4 because it is underneath the circuit board 262 (and any optional intervening layer 267, such as stiffener).

Figure 5A:
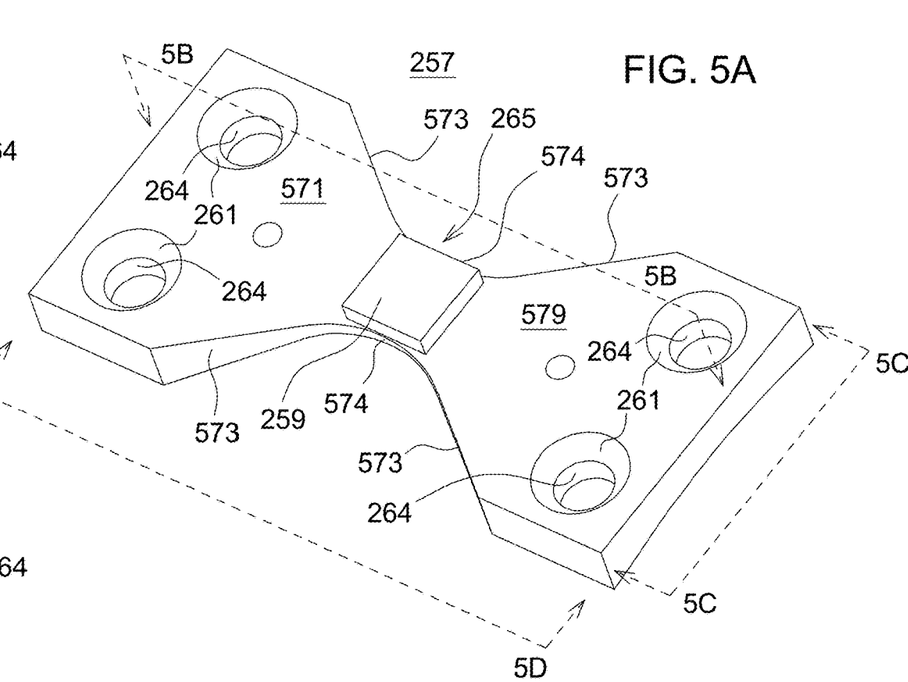
FIG. 5A illustrates a top perspective view of one embodiment of a concentrator (e.g., strain concentrator).
Figure 5B:
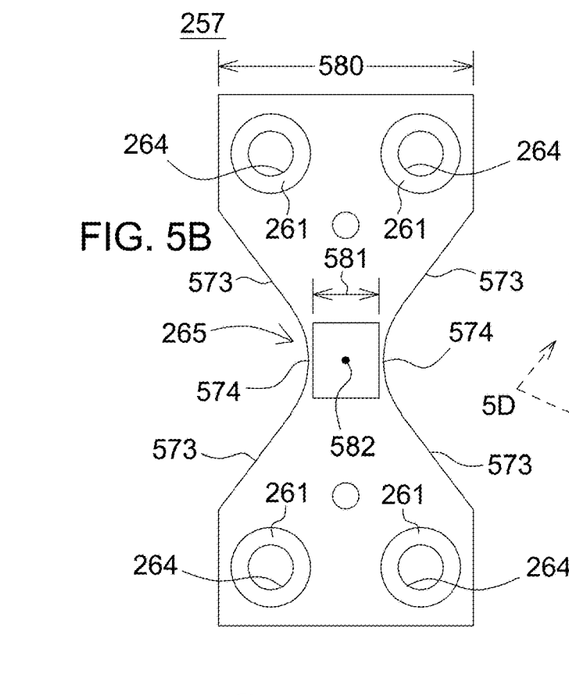
FIG. 5B illustrates a top or plan view of the embodiment of a concentrator of FIG. 5A.
Figure 5C:
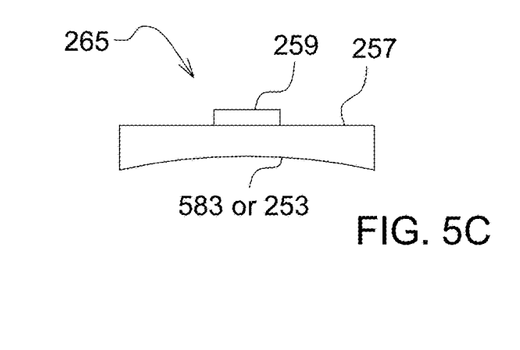
FIG. 5C illustrates a bottom side view of the embodiment of a concentrator of FIG. 5A.
Figure 5D:
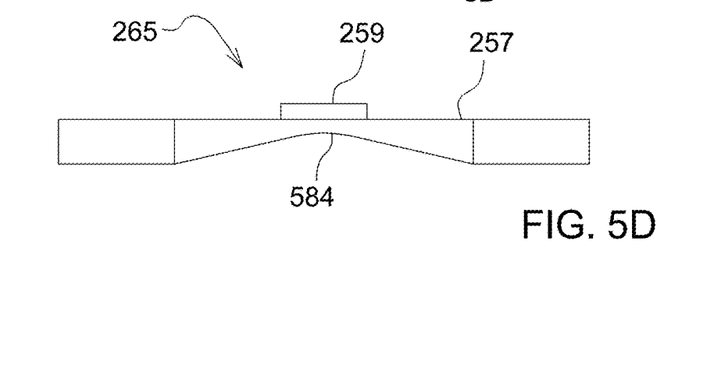
FIG. 5D illustrates a side view of the embodiment of a concentrator of FIG. 5A.

FIG. 5A illustrates a top perspective view of one embodiment of a concentrator 257 (e.g., strain concentrator). FIG. 5B illustrates a top or plan view of the embodiment of a concentrator 257 of FIG. 5A. FIG. 5C illustrates a bottom side view of the embodiment of a concentrator 257 of FIG. 5A. FIG. 5D illustrates a side view of the embodiment of a concentrator of FIG. 5A.

In accordance with FIG. 5A through 5D, inclusive, a concentrator 257 is connected to the mechanical component via fasteners that pass through openings 264 that align with the bores. As illustrated, the openings 264 are countersunk 261 or beveled, such that the head of the fastener can be flush with the upper surface of the concentrator 257 without any mechanical interference to any circuit board, stiffener or intervening layer. The concentrator 257 comprises a central neck portion 265 with an elevated pedestal 259, a first extremity region 571 extending outwardly away from the central neck portion 265 and a second extremity region 279 opposite the first extremity region 271. The second extremity region 279 extends outwardly away from the central neck portion 265. A strain sensor (101, 201) is mounted on or coupled to the concentrator 257 to transmit the applied force from the mechanical component (e.g., rotor 10 or shaft) via or through the concentrator 257 to the mechanical component (e.g., rotor 10 or shaft).

In one embodiment, the central neck portion 265 comprises an elevated pedestal 259 (e.g., mound or island) that is elevated above an outer surface defined by the first extremity portion 271 and the second extremity portion 279. The elevated pedestal portion 259 or elevated pedestal, which are synonymous and equivalent terms throughout this document, may be configured in accordance with various examples that may be applied separately or cumulatively.

Under a first example, the elevated pedestal 259 is substantially rectangular and adapted in size and shape to receive the strain sensor (101, 201).

Under a second example, the elevated pedestal 259 is substantially planar, wherein a substrate or a circuit board is adhesively bonded to the pedestal to amplify the applied force and wherein the strain sensor (101, 201) is mounted on the circuit board or the substrate.

Under a third example, the elevated pedestal 259 is substantially planar, wherein a substrate or circuit board is soldered or brazed to the pedestal 259 to amplify the applied force and wherein the strain sensor (101, 201) is mounted on the circuit board or the substrate.

Under a fourth example, the elevated pedestal 259 is substantially planar, wherein a substrate or circuit board is secured to the concentrator via one or more supplemental fasteners that engage corresponding bores in the concentrator (257, 157).

Under a fifth example, the elevated pedestal 259 is substantially planar, wherein the substrate or circuit board has an intermediate dampening layer to reduce or attenuate the applied force.

Under a sixth example, the strain sensor (101, 201) comprises a semiconductor die (50) that is adhesively bonded to the elevated pedestal 259.

Under a seventh example, the strain sensor (101, 201) comprises a semiconductor die (50) with a conductive pad on one side that is soldered to the elevated pedestal 259. For example, the intermediate dampening layer comprises an elastomeric isolator.

In some embodiments, the elevated pedestal 259 refers to a raised feature on a central portion of the concentrator 257 or strain concentrator. This elevated pedestal 259 is intended to interface directly to the strain sensor (101, 201) or the package (100, 200) (e.g., integrated circuit package) of the strain sensor (101, 201). For example for a package (100, 200) with pin lead terminals around a periphery of the strain sensor (101, 201), the package (100, 200) may have a central metallic pad (e.g., which is electrically grounded) on a bottom of the package (100, 200). The elevated pedestal 259 can be tailored or customized to interface with any kind of electronics package (e.g., integrated circuit package), such as ball-grid array, flip-chip or surface-mount package. The elevated pedestal 259 is generally raised above other portions of the concentrator to provide a clearance or stand-off for an accompanying rigid circuit board or flexible circuit board, that the strain sensor (101, 201) the may be optionally mounted to, where the circuit board provides an intermediate layer between the concentrator and the package (100, 200) of the strain sensor (101, 201), where the intermediate layer can be configured to amplify, attenuate or adjust the measurement of the applied force by the strain sensor (101, 201). For example, the flexible circuit board may allow greater motion or displacement of the strain sensor (101, 201), which tends to amplify the observed measurement of the applied force by the strain sensor (101, 201). Meanwhile, a rigid circuit board that is mounted on isolators (e.g., flexible, resilient rubber or elastomeric bushings or washers) or elastomeric layer may reduce the motion or displacement of the strain sensor (101, 201) which tends to attenuate the observed measurement of the applied force by the strain sensor (101, 201).

In certain embodiments, the elevated pedestal 259 can be connected to, or integral with, the concentrator, which closely couples strain and forces into the strain sensor (101, 201), or its corresponding package (e.g., integrated circuit package). The surface finish (e.g., surface roughness) of the elevated pedestal portion 259 can be controlled to foster adhesive bonding (e.g., non-conductive or conductive adhesive bonding) or solder bonding between the package of the strain sensor (101, 201) and elevated pedestal for optimum adhesion or performance. In addition, the strain concentrator may be fabricated out of solderable material such that the one or more metallic pads on the surface of the strain sensor (101, 201) can be soldered to the concentrator or to the elevated pedestal 259 of the concentrator 257.

As shown in FIG. 5A through FIG. 5D, inclusive, the first extremity region is V-shaped 573 and the second extremity region is V-shaped 573, where the apex 582 of each V-shaped region is integral with or extends from the neck region. In some embodiments, the first extremity region 571 has one or more of the openings 264 for receiving corresponding fasteners and wherein the second extremity region 279 has one or more of the openings for receiving corresponding fastener.

The first extremity region 571 and second extremity region 579 are generally wider than the central neck region of the concentrator 257. The first extremity region 571 and the second extremity region 579 each have an extremity width 580, which may be equal or different to each other. The neck region 265 has a corresponding neck width 581, where the extremity width 580 is generally greater than the neck width 501. For instance, the extremity width 580 of the first extremity region is at least twice as wide as the neck width 581 of the neck region 265. Similarly, the extremity width 580 of the second extremity region is at least twice as wide as the neck width 581 of the neck region 265.

A lower surface of the concentrator 257 has a curved or arched surface (253, 583) as illustrated in FIG. 5C. Meanwhile, the lower surface of the concentrator 257 has a notch or indentation 584, as best illustrated in FIG. 5D.

The concentrator 257 is composed of an elastically deformable, solderable metal alloy. For example, the metal alloy is composed of malleable iron or ductile iron.

In an alternate embodiment, the concentrator 257 is composed of an elastically deformable plastic matrix or polymer matrix that is filled with an embedded reinforcing fiber.

Figure 6:
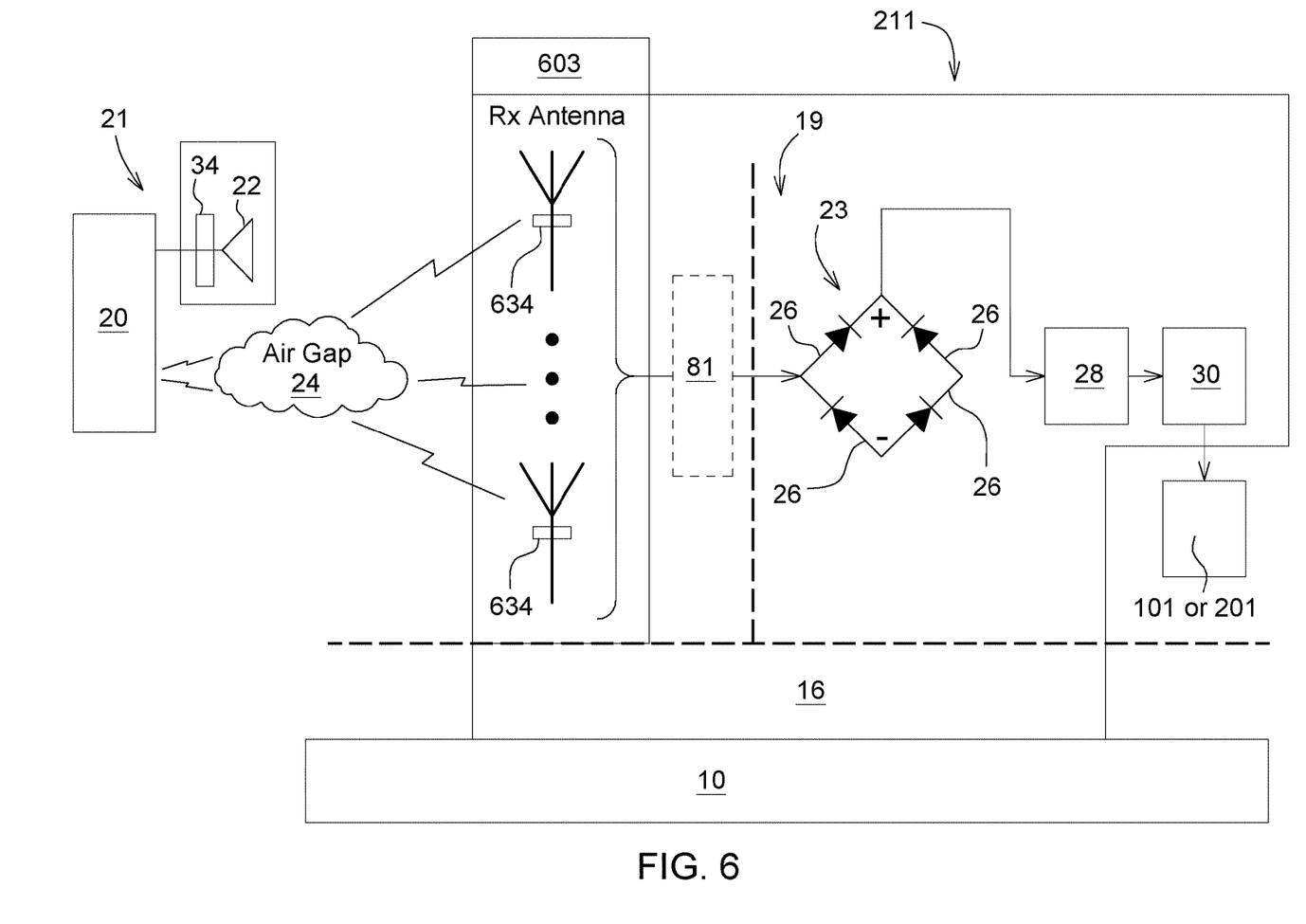
FIG. 6 comprises block diagram of a sensing system that includes an assembly for transferring electrical energy to a rotor or shaft with the concentrator and strain sensor mounted thereon.

FIG. 6 is a block diagram or schematic of the assembly 211 for contactless transferring electrical energy to a rotor 10, which can provide electrical energy to supply the strain sensor (101, 201). As illustrated in FIG. 6, the transmitter 20 and one or more transmit antennas 22 are on or co-located with the stator 21; the transmitter 20 is coupled to one or more transmit antennas 22 to transmit an alternating current or electromagnetic frequency aligned or coordinated with a corresponding resonant frequency of any tuned circuit 81 of the receiver 19. For example, in one configuration the electromagnetic frequency, or transmit frequency range and receive frequency range is less approximately less than or equal to 100 Kilohertz (KHz) or below the Amplitude Modulation (AM) Broadcast band in the United States. The transmit antenna 22 is stationary and supports a continuous power link with the receive antenna 603 on the rotor 10 (e.g., shaft 10).

The transmitter 20 is configured to transmit an alternating current wireless signal or electromagnetic radiation. The transmit antenna 22 may use one or more ferrite members 34 to focus or shape the electromagnetic field in the gap 24 for enhanced inductive coupling or enhanced energy transfer between the receive antenna 603 and the transmit antenna 22. For instance, with respect to the receive antenna 603 one or more ferrite members 634 may be ferrite blocks or ferrite beads, or other ferrite members that are radially distributed around an inner diameter of the conductors of the receive antenna 603 (e.g., to form a partial core). In certain embodiments, the receive antenna 603 comprises ferrite members 634 arranged radially inward from the conductive traces or conductive loops of the receive antenna to concentrate the wireless signal; hence, energy transfer from the transmit antenna 22 to the receive antenna, within the axial gap 24. Meanwhile optional ferrite members 34 may form a core upon which the transmit antenna 22 is wound. The transmitter 20 and the transmit antenna 22 may be collectively referred to as stationary electronics, which can interface with a vehicle control system or communicate with electronic controllers or other network devices via a vehicle data bus, such as controller area network or Ethernet vehicle bus.

In one embodiment, the receive antenna 603 (e.g., generally circular, spiral or elliptical antenna) comprises a set one or more of electrical conductors embedded in, wrapped around, looped, wound around, or associated with the rotor 10 or shaft. The receive antenna 603 (e.g., generally circular, spiral or elliptical antenna, which can be wound, looped, or wrapped around a dielectric member or form that at least partially surrounds or that is orbital about the shaft) is configured to support a link (e.g., continuous link or continuous transfer via inductive coupling) of power between the transmit antenna 22 and the receiver 19 antenna via the gap 24. Further, in some embodiments the receive antenna 603 the looped conductors or wire windings are circularly wound or spirally wound about engaged adjoining dielectric arched members or arched dielectric forms. The receive antenna 603 receives an alternating current signal or electromagnetic signal transmitted by the transmitter 20 and its transmit antenna 22. The receive antenna 603 is coupled to a tuned circuit 81 or a filter, such as a passband filter aligned with the transmit frequency range (e.g., frequency range within a half-power bandwidth) or transmit frequency (e.g., carrier frequency or central frequency) of the transmitter 20.

In FIG. 6, the receiver 19 comprises receive circuitry, such as a tuned circuit 81 and one or more rectifiers 23 or diodes 26, for receiving the alternating current signal and rectifying it to a target direct current voltage level. The receiver 19, alone or together with the receive antenna 603, may be incorporated into a receiver 19 housing, electronics housing, or rotatable housing 16 that can rotate with the rotor 10 (e.g., shaft). In one embodiment, the tuned circuit 81 is tuned or established to have a resonant frequency commensurate with or equal to a transmitting frequency or transmitting frequency range of a transmitter 20. For example, the tuned circuit 81 may be formed by a combination of a capacitor and an inductor (e.g., or receive antenna 603) that are placed in series or in parallel with respect to each other, where the values of the capacitor and inductor (e.g., or receive antenna 603) are selected to resonate at a resonant frequency commensurate with or equal to a transmitting frequency or transmitting frequency range of a transmitter 20. In some configurations, the inductor or receive antenna 603 may be associated with one or more ferrite members to adjust, increase or concentrate the inductance of the inductor (e.g., with respect to a baseline or reference air-core inductor configuration).

The alternating current output of the tuned circuit 81 is provided to rectifier 23 or diodes 26. As illustrated in FIG. 6, the rectifier 23 comprises a full-wave bridge rectifier 23 that comprises four diodes 26 that convert or rectify the alternating current signal to a direct current (DC) signal.

In one embodiment, the DC signal is provided to signal conditioner 28 or power conditioning circuit. For example, the signal conditioning 28 or power conditioning circuit may comprise any of the following: a low pass filter or an filtering capacitor to reduce alternating current noise in the signal, to smooth the DC signal fluctuation and to provide energy storage to support greater current draw of load devices that would otherwise be possible. The output of the signal conditioner 28 may be coupled to the input of voltage regulator.

The voltage regulator 30 may maintain a regulated output voltage within a certain voltage range. For example, the voltage regulator may comprise a linear and drop-out (LDO) regulator the provides a regulated output voltage, from an input voltage that may be higher than the target output voltage or target output voltage range of the LDO regulator. The output of the direct current (DC) may be at the output of the rectifier 23, the signal conditioner 28, or the voltage regulator 30, where the latter is preferred for a filtered, regulated or smoothed output DC voltage. The regulated output voltage may provide an output voltage, within a range of 1 VDC to 12 VDC, for example.

In certain configurations, the direct current (DC) signal may be used to provide electrical energy for a sensor or another electric device on the rotor 10 including one or more of the following: a strain sensor (101, 201) 101, and/or one or more receivers 19.

The system of the disclosure uses a concentrator (e.g., strain concentrator) that can be designed and scaled to fit a plethora of applications, such as rotor or on-shaft sensing of torque. Further, the concept can be scaled in size and shape to interface with any size shaft. The concentrator can take on any form factor required for use on other mechanical bodies other than shafts. Meanwhile, the elevated pedestal can be customized or standardized for interfacing to or with corresponding strain sensors in standard or customized packaging.

The concentrator can be fabricated from a wide range of metallic or non-metallic materials, where the selected materials can be adapted toward a given application or set of measurement requirements.

The concentrator is well suited for configuring, modulating or enhancing the signal path, or sensed signal outputted by the strain sensor. For example, physical configuration of the concentrator, or associated circuit boards, isolators and elastomeric layers, can amplify, dampen, or remain neutral to a strain signal as the displacement forces pass from the target body through the strain concentrator and associated with the strain sensor, or its electronics-device package.

Although certain embodiments of receiver 19s, systems, methods, processes and examples have been described in this disclosure, the scope of the coverage of this disclosure may extend to variants of the receiver 19, systems, methods, processes and examples and systems and concepts disclosed herein. For example, in any patent that may be granted on this disclosure, one or more claims can cover equivalents and variants to the full extent permitted under applicable law, among other things.

The following is claimed:

1. A sensing system comprises:
    a mechanical component that is subject to an applied force, the mechanical component having an outer surface with bores;
    a concentrator connected to the mechanical component via fasteners that pass through openings that align with the bores, the concentrator comprising a central neck portion with an elevated pedestal, a first extremity region extending outwardly away from the central neck portion and a second extremity region opposite the first extremity region, the second extremity region extending outwardly away from the central neck portion; and
    a strain sensor mounted on the concentrator to transmit the applied force from the mechanical component via or through the concentrator to the mechanical component, wherein the central neck portion comprises an elevated pedestal of the central neck portion that is elevated above the first extremity region and the second extremity region, and wherein a lower surface of the concentrator has a notch or indention in the central neck portion along a longitudinal axis of the concentrator.

2. The sensing system according to claim 1 wherein the elevated pedestal is substantially rectangular and adapted in size and shape to receive the strain sensor.

3. The sensing system according to claim 1 wherein the elevated pedestal is substantially planar and wherein a substrate or a circuit board is adhesively bonded to the pedestal to amplify the applied force and wherein the strain sensor is mounted on the circuit board or the substrate.

4. The sensing system according to claim 1 wherein the elevated pedestal is substantially planar and wherein a substrate or circuit board is soldered or brazed to the pedestal to amplify the applied force and wherein the strain sensor is mounted on the circuit board or the substrate.

5. The sensing system according to claim 1 wherein the elevated pedestal is substantially planar and wherein a substrate or circuit board is secured to the concentrator via one or more supplemental fasteners that engage corresponding bores in the concentrator.

6. The sensing system according to claim 1 wherein the elevated pedestal is substantially planar and wherein a substrate or circuit board has an intermediate dampening layer to reduce or attenuate the applied force.

7. The sensing system according to claim 1 wherein the strain sensor comprises a semiconductor die that is adhesively bonded to the elevated pedestal.

8. The sensing system according to claim 1 wherein the strain sensor comprises a semiconductor die with a conductive pad on one side that is soldered to the elevated pedestal.

9. The sensing system according to claim 1 wherein the intermediate dampening layer comprises an elastomeric isolator.

10. The sensing system according to claim 1 wherein the first extremity region is V-shaped and wherein the second extremity region is V-shaped, where the apex of each V-shaped region is integral with or extends from the neck region.

11. The sensing system according to claim 1 wherein the first extremity region has one of the openings in the concentrator for receiving a corresponding one of the fasteners and wherein the second extremity region has one of the openings in the concentrator for receiving a corresponding one of the fasteners.

12. The sensing system according to claim 1 wherein the first extremity region is at least twice as wide as the neck region.

13. The sensing system according to claim 9 wherein the second extremity region is at least twice as wide as the neck region.

14. The sensing system according to claim 1 wherein the concentrator is composed of an elastically deformable, solderable metal alloy.

15. The sensing system according to claim 14 wherein the metal alloy is composed of malleable iron or ductile iron.

16. The sensing system according to claim 1 wherein the lower surface of the concentrator has an arched cross-sectional portion transverse to its longitudinal axis.

17. The sensing system according to claim 1 wherein the mechanical component comprises a shaft and wherein a mounting interface has concave surface to engage with a shaft and a generally planar surface, opposite the concave surface, to support mounting of the concentrator to the mounting interface.

18. A sensing system comprising:
a mechanical component that is subject to an applied force, the mechanical component having an outer surface with bores;
a concentrator connected to the mechanical component via fasteners that pass through openings that align with the bores, the concentrator comprising a central neck portion with an elevated pedestal, a first extremity region extending outwardly away from the central neck portion and a second extremity region opposite the first extremity region, the second extremity region extending outwardly away from the central neck portion; and
a strain sensor mounted on the concentrator to transmit the applied force from the mechanical component via or through the concentrator to the mechanical component, wherein the concentrator is composed of an elastically deformable plastic matrix or polymer matrix that is filled with an embedded reinforcing fiber.

* * * * *